June 6, 1972 M. H. BURCKHARDT ET AL 3,667,813
INSTALLATION FOR PREVENTING SPINNING OF THE DRIVEN
WHEELS OF A MOTOR VEHICLE
Filed Oct. 31, 1969 3 Sheets-Sheet 1
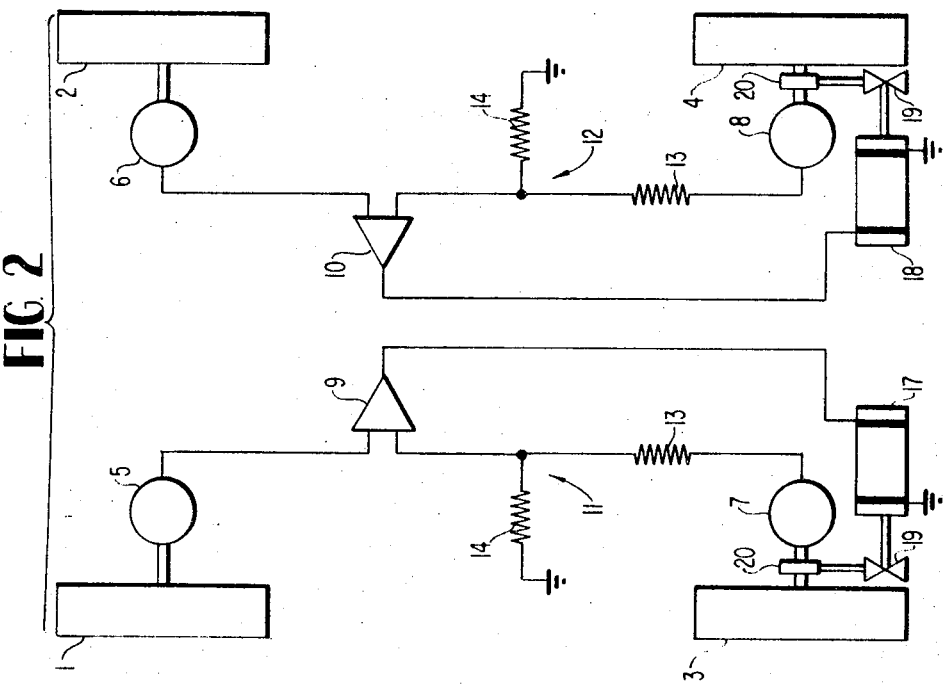
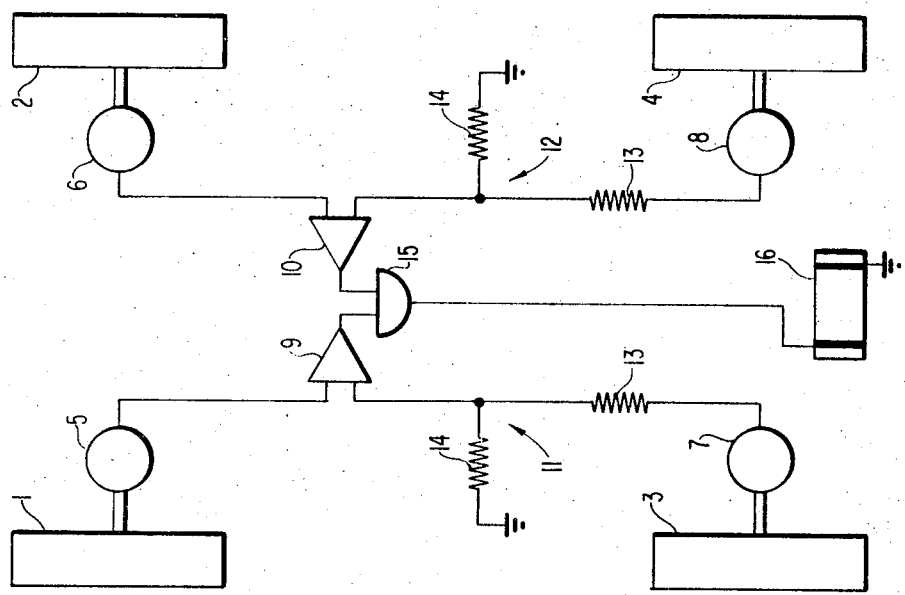
INVENTORS
MANFRED H. BURCKHARDT
HANS-JÖRG FLORUS
HORST GROSSNER
BY *Craig, Antonelli, Stewart & Hill*
ATTORNEYS

INVENTORS
MANFRED H. BURCKHARDT
HANS-JÖRG FLORUS
HORST GROSSNER

United States Patent Office 3,667,813
Patented June 6, 1972

3,667,813
INSTALLATION FOR PREVENTING SPINNING OF THE DRIVEN WHEELS OF A MOTOR VEHICLE
Manfred H. Burckhardt, Waiblingen, Hans-Jorg Florus, Goppingen, and Horst Grossner, Geradstetten, Germany, assignors to Daimler-Benz Aktiengesellschaft, Stuttgart-Unterturkheim, Germany
Filed Oct. 31, 1969, Ser. No. 872,892
Claims priority, application Germany, Nov. 2, 1968, P 18 06 671.2
Int. Cl. B60t 8/08
U.S. Cl. 303—21 EB           18 Claims

ABSTRACT OF THE DISCLOSURE

An installation for preventing the spinning of the driven wheels of a motor vehicle in which the rotational slippage between the driven and non-driven wheels is determined, and in which the rotational speed of the driven wheels is controlled in dependence on the magnitude of such slippage.

---

The present invention relates to an installation for the prevention of the spinning of the driven wheels of a motor vehicle.

Since in motor vehicles the engine torque or the engine rotational speed is customarily pre-set by way of a gas or drive pedal, it may happen, in particular with motor vehicles having strong engines, that the torque at the driven wheels becomes so large that they lose the frictional contact and slip or spin. In order to prevent this spinning, an installation has already been proposed heretofore which utilizes as criterion or indication for the spinning of a wheel the rotary acceleration of the driven wheel or of the cardan shaft. This prior art installation, however, entails the disadvantage that this criterion or characteristic is an abstract value that does not take into consideration the respectively existing value of the friction contact.

The present invention aims at creating an installation of the aforementioned type in which the frictional value of the road surface to the driven wheel is determined so that it becomes possible to transmit an optimum torque under all road conditions. The present invention essentially consists in that control installations are provided which determine the rotational slippage between the driven wheels and the non-driven wheels and which control the rotational speed of the driven wheels in dependence on the magnitude of the slippage. It can be achieved thereby that the slippage is kept at a predetermined value, for example, at 15%, at which a maximum torque can be transmitted under all road conditions.

In an advantageous type of construction of the present invention, each wheel may be provided with a generator that produces an electrical voltage proportional to the rotational speed. The generators may be constructed as D.C. or A.C. generators. However, provision may be preferably made that frequency generators equipped with frequency-voltage converters are utilized. Such a frequency generator produces a frequency proportional to the rotational speed which is converted in the frequency-voltage converter into an electrical voltage proportional to the rotational speed of the wheel. In order to obtain a control magnitude dependent on the slippage between the driven and the non-driven wheels, the voltages produced by the generators of a driven and of a non-driven wheel, preferably of the wheels of one and the same vehicle side, can be connected to the inputs of a differential amplifier, and a voltage divider may be arranged in the feed line from a generator which establishes a voltage difference proportional to the selected slippage. Appropriately, the differential amplifier may be so constructed and designed that upon exceeding the pre-selected slip, it produces a positive signal in its output.

In order to control with this signal the rotational speed of the driven wheels, the outputs of the differential amplifiers of both vehicle sides may be connected, preferably by the interposition of a logic element, with an actuating member that reduces by interruption of the ignition or by a reduction of the supplied fuel quantity or the like, the engine torque in the presence of a signal at its input. An instantaneous or immediate decrease of the engine torque is achieved thereby which is connected with an immediate torque decrease at the driven wheels. The slippage will therefore drop very quickly below its adjusted value and the engagement at the engine is again cancelled. The actuating period lasts thereby only few or even only individual operating cycles of the engine so that they are hardly perceived or not perceived at all by the driver. The individual control cycles can therefore follow one another in rapid succession without being noticed in a disturbing manner. A maximum torque at the driven wheel is established thereby in such a manner that at none of these wheels a slippage above the adjusted value, for example, 15%, occurs.

In order to achieve a better differentiation in that only that wheel is controlled which in fact spins, provision may be made that the output of the differential amplifier of each vehicle side is connected to its own actuating member, which in the presence of a signal at its input, actuates the brake of the corresponding driven wheel. As a result of repeating control cycles or control interplays so much torque is absorbed by the brake that the maximum torque for the adjusted slippage value can still be transmitted to the road. Additionally, the advantage results thereby that the torque absorbed by the brake is available as driving torque for the other wheel by the way of the customarily present differential gear.

In a further development of the present invention, provision may be made that the outputs of the differential amplifiers are both connected to an actuating member decreasing the engine torque as also to an actuating member acting on the brakes of the driven wheels. Provision may thereby be made in a particularly advantageous manner that the outputs of both differential amplifiers are connected, on the one hand, with a logic element that produces a signal for the actuating member decreasing the engine torque only in the presence of the signals of both differential amplifiers whereas on the other, they are each connected to a respective logic element connected with the actuating member of the corresponding brake, which latter logic elements are adapted to be blocked by the logic element of the actuating member reducing the engine torque connected to the second input thereof. It is achieved thereby that in case of spinning of a driven wheel, the same is held fast by means of its brake whereas during the spinning of both wheels, the torque of the engine is reduced.

A structurally appropriate type of construction of the present invention with a control of the rotational speed of the driven wheels by means of the brakes thereof is obtained if the wheel brake cylinders of the driven wheels are adapted to be connected with a pressure tank or reservoir of the brake medium by way of an inlet valve adapted to be shifted by the actuating member. In order to reduce the large number of control cycles, advantageous as such for the driving comfort and therewith to save the brakes and the control installation, there may be provided, in addition to the control installations actuating the brakes, additional control installations which maintain the engagement of the brakes within a predetermined slippage range. As a result thereof, the control can be expanded by an upper and a lower limit value to a predetermined slippage range in that, for example, at a 15% slip, the braking of the driven wheels begins which is terminated only at the lower limit value, for example, at a 5% slip. Provision may be made therefor in a particularly advantageous manner that an inlet valve adapted to be shifted by a differential amplifier adjusted to the upper limit value of the slip and an outlet valve adapted to be shifted by a differential amplifier adjusted to the lower limit value of the control range of the slip are arranged in the brake medium circulation system of the wheel brakes of the driven wheels provided with the pressure tank. In order to achieve in connection therewith that the outlet or discharge valve opens only during a decrease of the slippage from the upper limit value to the lower limit value and not in the opposite direction, an AND-gate may be connected ahead, i.e., in the input of a transistor actuating the discharge or outlet valve whose input is connected to the output of the differential amplifier adjusted to the lower boundary value of the slippage range and whose other input is connected to a pressure switch arranged between the inlet and the outlet valve. It is achieved thereby that the discharge valve is opened only when pressure is present in the wheel brake, i.e., when the slippage has been controlled by braking down from the upper limit value to the lower limit value. In a structurally advantageous manner, the output of the differential amplifier adjusted to the upper boundary value of the slippage range may open the inlet valve by way of an interconnected transistor which simultaneously closes a closure valve separating the master brake cylinder from the brake medium circulation system.

The control installation for the braking of the driven wheels in dependence of their slip in relation to the non-driven wheels must, of course, be rendered inoperable, i.e., must be out of operation during the normal braking operation. Consequently, provision may be made in an appropriate manner that the control installation acting on the wheel brakes are adapted to be disengaged during the normal braking operation by a contact preferably coordinated to the brake light switch.

Accordingly, it is an object of the present invention to provide an installation for the prevention of the spinning of the driven wheels of a motor vehicle which avoids by simple means the aforementioned shortcomings and drawbacks encountered in the prior art.

Another object of the present invention resides in an installation for preventing the spinning of the driven wheels of a motor vehicle which takes into consideration the existing value of the frictional contact of the wheels with the road surface which exists at a given time.

A further object of the present invention resides in an installation of the type described above which enables the transmission of optimum torque under all existing road conditions.

Still a further object of the present invention resides in an installation for preventing the spinning of the driven wheels of a motor vehicle in which the slip of the driven wheels can be caused to drop very quickly below the adjusted value and in which the control cycles are hardly or not noticeable at all to the driver.

Still another object of the present invention resides in an installation for preventing the spinning of wheels in which the parts used in the control system are of relatively simple construction and relatively few in number.

These and further objects, features and advantages of the present invention will become more obvious from the following description when taken in connection with the accompanying drawing which shows, for purposes of illustration only, several embodiments in accordance with the present invention, and wherein:

FIG. 1 is a schematic diagram of an installation in accordance with the present invention with a control of the slip by means of the engine rotational speed or engine torque;

FIG. 2 is a schematic diagram of an installation in accordance with the present invention with a control of the slip by a braking of the driven wheels;

Figure 3:
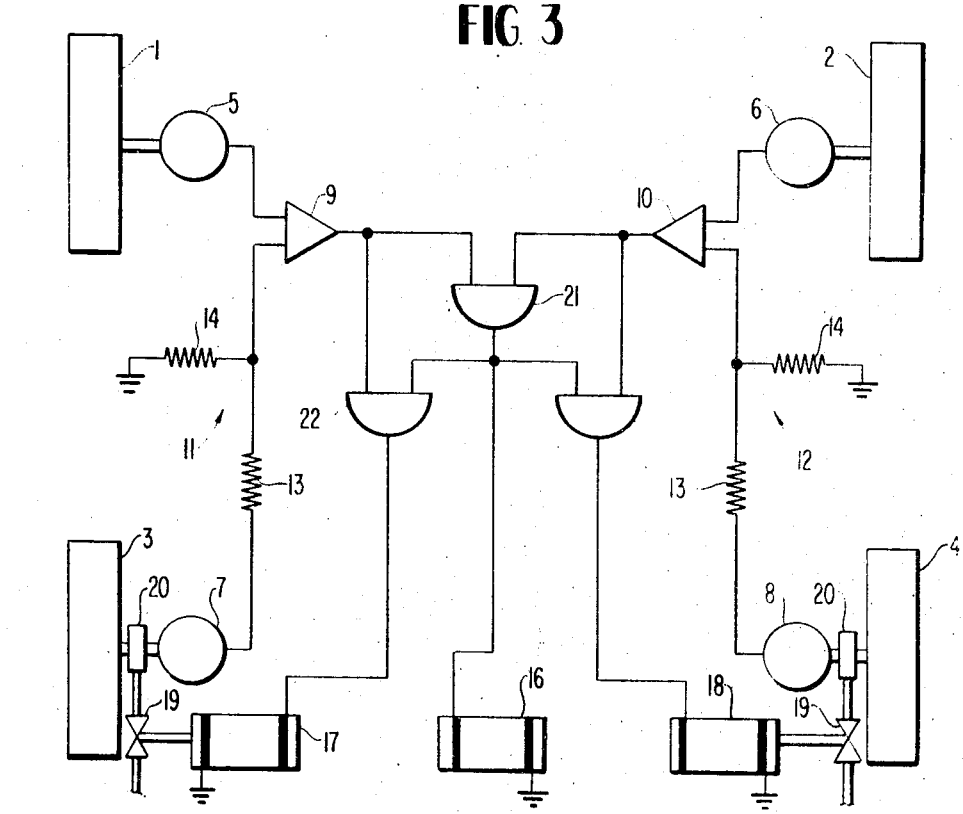
FIG. 3 is a schematic diagram of an installation in accordance with the present invention representing a combination of FIGS. 1 and 2.

Referring now to the drawing wherein like reference numerals are used throughout the various views to designate like parts, and more particularly to FIG. 1, in order to determine the slip between the non-driven wheels 1 and 2 and the driven wheels 3 and 4, shown in FIG. 1, of a vehicle, the wheels 1, 2, 3, and 4 are each equipped with a generator 5, 6, 7, and 8, respectively, which produce an electric voltage proportional to the rotational speed of a corresponding wheel. Either D.C. or A.C. generators may be used for that purpose. However, preferably conventional frequency generators are used for that purpose which produce a frequency proportional to the rotational speed that is converted in a conventional frequency-voltage-converter into a voltage proportional to the rotational speed. For purposes of determining the slippage, the generators 5 and 7, and the generators 6 and 8 of a respective driven wheel 3 and 4 and of a respective non-driven wheel 1 and 2 of a corresponding vehicle side are connected to the inputs of a corresponding differential amplifier 9 and 10 of conventional construction. These differential amplifiers 9 and 10 are preferably conventional operational amplifiers without feedback. Since such differential amplifiers are known as such in the prior art, a detailed showing thereof is dispensed with herein.

The voltages produced by the generators 7 and 8 of the driven wheels 3 and 4 are applied by way of voltage dividers generally designated by reference numerals 11 and 12 and including the resistances 13 and 14 to the inputs of the differential amplifiers 9 and 10, by means of which the voltages are divided at the ratio of the maximum permissive slippage value, for example, for a +15% slippage, a voltage division at the ratio of 0.85:1 is carried out by the selection of corresponding resistances 13 and 14 for the voltage dividers 11 and 12. As long as only a small slip exists, the voltage supplied or fed from the driven wheels 3 and 4 to the differential amplifiers 9 and 10 is smaller so that the differential amplifiers 9 and 10 are biased in one predetermined, defined condition. If the voltage of the driven wheels 3 and 4 increases during spinning above the value of the voltage of the non-driven wheels as a result of the slippage, then at a predetermined slippage value which is determined by the resistance ratio of the voltage dividers 11 and 12, the differential amplifiers 9 and 10 are flipped over into the other conditions, i.e., are controlled in the other direction. Consequently, a signal is produced at the output of the differential amplifiers 9 and 10 as soon as the predetermined slippage value is exceeded.

As soon as a larger slippage occurs at one or both driven wheels 3 and 4, the corresponding signal or signals are transmitted by way of a conventional logic element 15 to a conventional actuating member 16 which is arranged at the engine of the vehicle. The actuating member 16 may, for example, render inoperable the ignition of the combustion engine by turning off the current supply of the ignition device by way of a transistor or may reduce the injection quantity in an engine with fuel injection. The latter can take place with a mechanical injection by means of a so-called stop magnet at the injection pump or with an electronically controlled injection by the interruption of the current supply at the electromagnetically actuated valves, by an interengagement in the electronic control or by direct adjustment of the throttle valve by means of a magnet. An immediate decrease of the engine torque is achieved thereby which is connected with an immediate torque decrease at the driven wheels 3 and 4. The slippage value will therefore drop very quickly below its adjusted boundary or limit value, for example, +15%, and the engagement at the engine is annulled. Since the actuating time lasts only few or only individual operating cycles of the engine, it is hardly noticed or not noticed at all by the driver. The individual control cycles can therefore succeed one another in a rapid manner without being noticed disturbingly. The maximum torque at the driven wheels 3 and 4 is so adjusted that at none of these wheels 3 or 4 a slip of more than, for example, +15% occurs.

In the embodiment according to FIG. 1, no differentiation is made whether only one or both of the driven wheels 3 and 4 tend to spin. However, it may happen that only one of the driven wheels 3 or 4 will spin if this wheel 3 or 4 finds a part of the road surface with smaller friction value. It is then only necessary to reduce the torque at this wheel 3 or 4. This control is made possible in the embodiment according to FIG. 2.

The determination of the slip is made, as in the embodiment according to FIG. 1, by way of generators 5, 6, 7 and 8 connected to the driven wheels 3 and 4 and to the non-driven wheels 1 and 2; the voltages of the generators 5, 6, 7, and 8 proportional to the rotational speed of the corresponding wheels, are fed to the differential amplifiers 9 and 10. A voltage divider generally designated by reference numerals 11 and 12 is thereby also arranged in the lines from the generators 7 and 8 of the driven wheels 3 and 4 to the differential amplifiers 9 and 10, which voltage dividers adjust with the aid of the two resistances 13 and 14 thereof, the desired slippage value. The output of each differential amplifier 9 and 10 is, however, supplied only to its own respective actuating member 17 and 18. These actuating members 17 and 18 switch each a magnetic valve 19 which is able to connect the wheel brakes 20 of the driven wheels 3 and 4 with a conventional pressure tank or reservoir (not shown) of the brake medium.

If the slippage on one vehicle side between the non-driven wheel 1 or 2 and the driven wheel 3 and 4 exceeds the adjusted value, then a signal is produced by the respective differential amplifier 9 or 10 to the associated actuating member 17 or 18. This actuating member 17 or 18 opens the associated magnetic valve 19 and connects the pressure tank with the wheel brake cylinder so that the corresponding driven wheel 3 or 4 is prevented from spinning by a braking action. Thereafter, the signal of the differential amplifier 9 or 10 again disappears. As a result of the repeating control cycles, just so much torque is absorbed by the brake 20 that the torque for the adjusted slippage value, for example, +15% can still reach the street. The torque absorbed by the brake 20 is available as driving torque by way of the customarily present differential gear to the other driven wheel 3 or 4. This control installation, of course, has to be inoperable during the normal braking operation.

In the embodiment according to FIG. 3, the control installations for the prevention of the spinning of the driven wheels 3 and 4 corresponding to the embodiments according to FIGS. 1 and 2 are so combined that during the spinning of an individual driven wheel 3 or 4, the same is held fast by means of its brake 20 whereas during spinning of both driven wheels 3 and 4, the torque of the engine is reduced. Also, in this embodiment, the slippage is again determined by the voltages produced by the generators 5, 6, 7, and 8 connected to the driven wheels 3 and 4 and to the non-driven wheels 1 and 2 under interconnection of voltage dividers generally designated by reference numerals 11 and 12 and differential amplifiers 9 and 10. The output of each differential amplifier 9 and 10 is connected in this embodiment with a conventional logic element 21 whose output is connected to an actuating member 16 corresponding to the embodiment in FIG. 1. The logic element 21 connected to the actuating member 16 arranged at the engine produces a signal only when it receives signals at both of its inputs from the differential amplifiers 9 and 10. In contradistinction thereto, the logic elements 22 connected with the actuating members 17 and 18 of the wheel brakes 20 only produce a signal if only the input thereof connected to the associated differential amplifier 9 or 10 is supplied with a signal. In case the logic element 21 connected to the outputs of both differential amplifiers 9 and 10 produces a signal, it blocks in a conventional manner the two logic elements 22 connected to the actuating members 17 and 18 of the wheel brakes 20 which are each connected with one input thereof to the output of this logic element 21.

Figure 4:
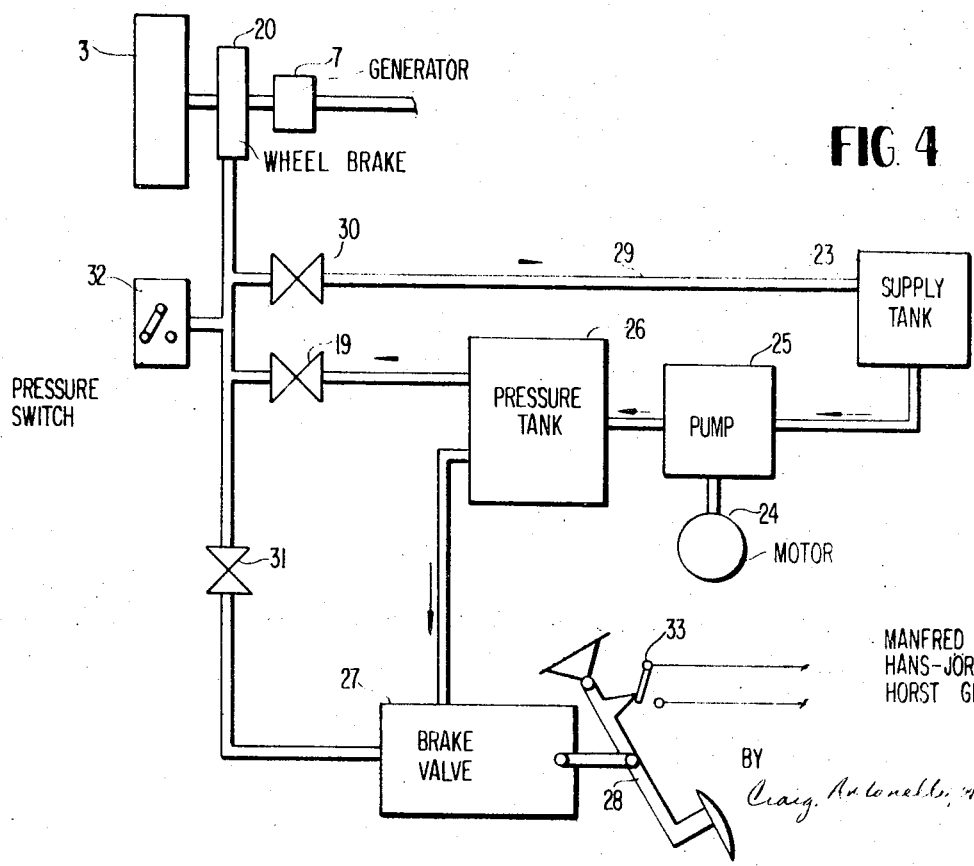
FIG. 4 is a schematic view of the mechanical parts of an installation according to the present invention for one driven wheel.

A practical embodiment of an installation for preventing the spinning of the driven wheels 3 or 4 is illustrated in FIG. 4 in which the wheels 3 or 4 are adapted to be braked by way of control installations by means of the vehicle brakes 20. Certain technical limitations are imposed to the practically realizable magnetic valves for high pressures necessary for such an installation as are requisite, for example, for the brake medium pressure. In the interest of a short response-time, they have to be energized very strongly which is achieved generally by a high current density in the winding. Such types of magnetic valves are therefore not suited for long periods of engagement or energization. Since also the electromagnetic forces in the magnetic valves are limited, the magnetic valves presently commercially available have to be specially constructed for the use in such an installation. For example, an inlet valve can no longer be opened if a pressure drop exists opposite its normal direction of flow. Additionally, it does not prove itself very appropriate in practice, even though it would be desirable for reasons of driving comfort, to provide very many control cycles in controls at the brakes because a high consumption in brake medium would take place thereby. Consequently, the number of control cycles is to be reduced by the introduction of a dead-time in the control circuit. For example, the brake 20 of the wheel 3 is to respond within the range of +15% to 5% slippage of the corresponding wheel in relation to a non-driven wheel 1. In consideration of these difficulties, the hydraulic construction illustrated in FIG. 4 is obtained for an installation in accordance with the present invention which is illustrated only for one driven wheel 3 but which is similar for the other driven wheel.

The brake medium circulatory system of the driven wheel 3 provided with a brake 20 and a generator 7 includes a supply tank 23 from which the brake medium is supplied to a pressure tank 26 by means of a pump 25 driven by a motor 24. The pressure tank 26 is connected with a brake valve 27 that is adapted to be actuated by way of a brake pedal 28 and establishes a connection with the wheel brake cylinder of the wheel brake 20. Additionally, a return line 29 to the supply tank 23 is provided from the wheel brake 20. Additionally, a by-pass line, which is equipped with the inlet valve 19, leads from the pressure tank 26 directly to the wheel brake cylinder. Therebeyond, still further magnetic valves 30 and 31 are provided of which one serves as discharge or outlet valve 30 and is arranged in the connecting line 29 to the supply tank 23 whereas the other serves as closure valve 31 to the brake valve 27 and is arranged in the line between the brake valve 27 and the wheel brake cylinder.

In the normal operating condition, the inlet valve 19, the closure valve 31, and the discharge or outlet valve 30 are not energized. The inlet and outlet valves 19 and 30 are thereby closed whereas the closure valve 31 is open. Consequently, during vehicle operations the brake 20 can be actuated in a conventional manner by means of the brake pedal 28. During a control for preventing the spinning of the driven wheel 3 by a braking of this wheel 3 is dependence of its slippage in relation to a non-driven wheel 1, the inlet valve 19 is opened upon exceeding a predetermined slippage value, i.e., the upper limit value which can be adjusted, for example, to +15%. Simultaneously therewith, the closure valve 31 is closed so that the brake medium under pressure from the pressure tank 26 is able to load or act upon the brake 20. If now, for example, as a result of the engagement of the brake 20, the slippage at the driven wheel 3 drops below the upper boundary value of, for example, +15%, then the inlet valve 19 and the closure valve 31 are no longer energized. As a result thereof, the inlet valve 19 closes and no further pressure is built up on the brake 20. The closure valve 31 is acted upon with pressure opposite its flow direction and therefore remains, as mentioned already above, in its closed position as a result of this pressure drop. This condition remains, if the upper boundary value of the slippage is not reached once more until the lower boundary value of the slippage, for example, +5% is reached. The pressure in the brake is now decreased by the actuation of the outlet or discharge valve 30. Since also the discharge valve 30 should not be continuously energized, a pressure switch 32 is additionally inserted or included between the inlet and outlet valves 19 and 30 which produces an electrical signal, for example, by way of a contact, as long as pressure still exists in the brake 20. This signal is fed by way of a conventional logic element to the discharge valve 30 when the slippage is below the lower boundary value and simultaneously pressure is still present in the brake 20. Additionally, it is achieved thereby that the discharge valve 30 is actuated only when the pressure is present in the brake 20 and the slippage has moved below the lower boundary value coming from the upper limit value.

In order to disconnect the entire control installation during the actuation of the brake pedal 28, a contact is connected with the brake light switch 33 which brings about that during actuation of the brake pedal 28, all of the valves 19, 30 and 31 cannot be energized so that the closure valve 31 is then open, whereas the inlet and outlet valves 19 and 30 are closed.

Figure 5:
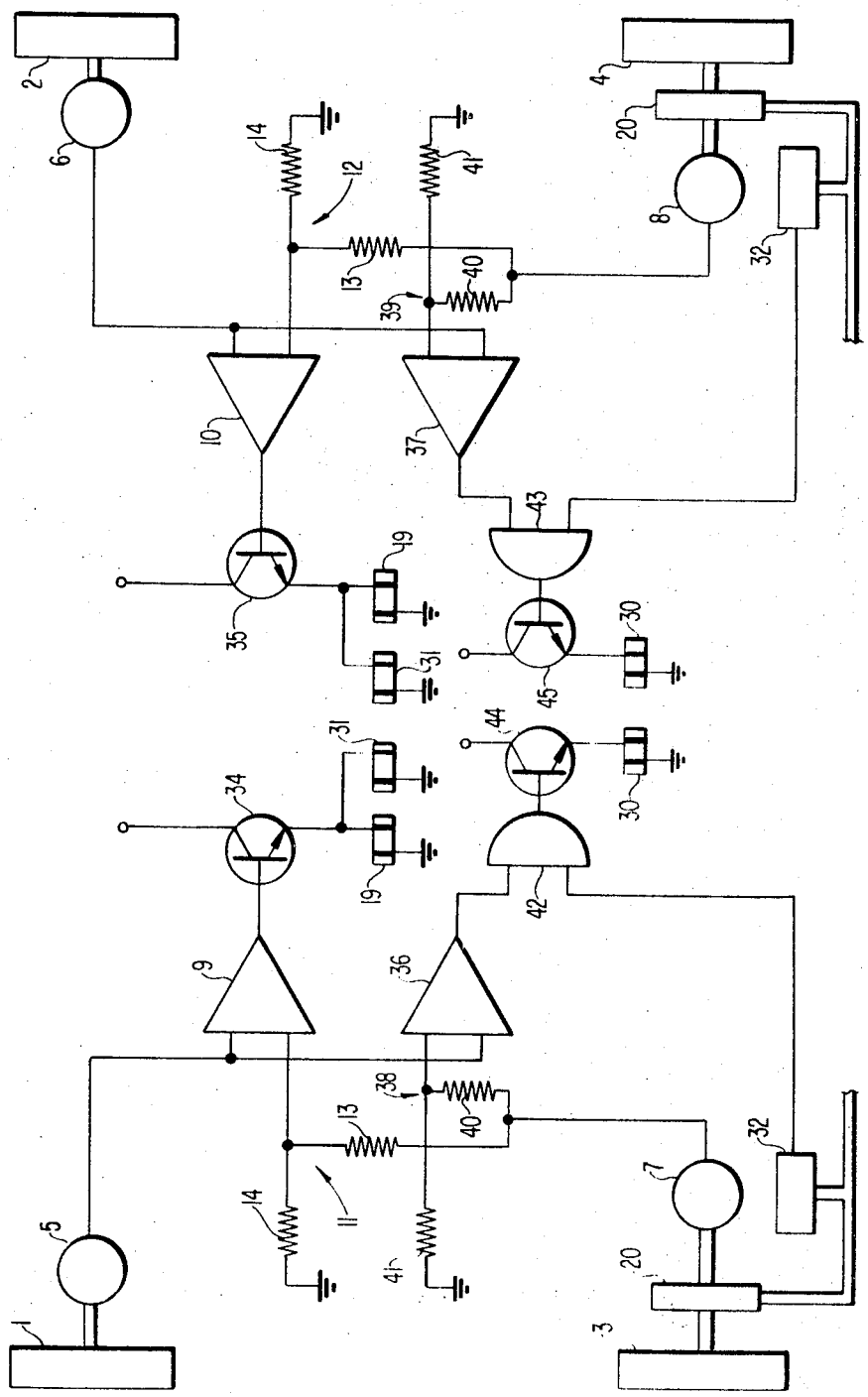
FIG. 5 is a schematic wiring diagram of a circuit for the installation according to FIG. 4.

The electronic control for the installation according to FIG. 4 is schematically illustrated in FIG. 5 and is described for an embodiment of a motor vehicle with two driven wheels 3 and 4 and two non-driven wheels 1 and 2. The driven and non-driven wheels 1, 2, 3 and 4 are equipped with generators 5, 6, 7 and 8 which produce a rotational-speed-dependent voltage. These voltages are fed to the inputs of the differential amplifiers 9 and 10 whereby voltage dividers generally designated by reference numerals 11 and 12 are arranged in the lines from the generators of the driven wheels 3 and 4, as already described in the foregoing embodiments, whose resistances 13 and 14 are so chosen that a voltage difference exists at the two inputs of the differential amplifiers 9 and 10 which corresponds to the slippage selected as the upper boundary value, for example, to +15%. The output of these differential amplifiers 9 and 10 is connected with a transistor 34 and 35, respectively, which is supplied, for example, with battery voltage and which, in the presence of a signal at the output of the corresponding differential amplifier 9 or 10, energizes the inlet valve 19 and the closure valve 31 of the brake circuit of the corresponding driven wheels 3 and 4. Thus, a braking of the respective driven wheel 3 or 4 takes place in the manner described above whose slippage in relation to the non-driven wheel 1 or 2 exceeds the adjusted upper boundary value, for example, of +15%. If the slippage drops below the upper boundary value, then the signal disappears at the associated differential amplifier 9 or 10, and the transistor 34 or 35 interrupts the energization of the inlet valve 19 and of the closure valve 31. As already described hereinabove, the inlet valve 19 thereby closes whereas the closure valve 31 continues to remain in its closed condition.

This condition remains for such length of time until a lower boundary value, for example, +5% slippage is reached and in fact is surpassed. The reaching of the lower boundary value is registered by way of further conventional differential amplifiers 36 and 37 which are also connected to the generators 5 and 7 and the generators 6 and 8 of the driven wheels 3 and 4 and of the non-driven wheels 1 and 2 of a vehicle side. Voltage dividers generally designated by reference numerals 38 and 39 are thereby also arranged in the lines from the generators 7 and 8 of the driven wheels 3 and 4 to the respective associated differential amplifiers 36 and 37; the resistances 40 and 41 of the voltage dividers 38 and 39 are selected in the ratio of the slippage adjusted as lower boundary value. The differential amplifiers 36 and 37 are so constructed that they produce a signal in the output thereof when the lower boundary value has been exceeded (in a downward direction). The output of these differential amplifiers 36 and 37 is connected, respectively, to the input of a corresponding AND-gate 42 and 43 whose output is connected to a transistor 44 and 45, respectively, that is acted upon by battery voltage and is able to energize the discharge valve 30 of the corresponding brake 20. The second input of the AND-gate 42 and 43 is connected with the pressure switch 32 arranged between the inlet valve 19 and the outlet valve 30 which produces a signal only when the brake 20 is acted upon with pressure. In that case, the AND-gate 42 or 43 switches the transistor 44 or 45 which energizes the corresponding discharge valve 30 which thereupon opens. Since the AND-gate 42 or 43, switches the transistor 44 or 45 only with a slippage below the boundary value of, for example, +5% and in the presence of a pressure in the wheel brake 20, this means that the discharge valve 30 can only be opened when the slippage has exceeded the upper boundary value of, for example, +15% and a control operation has been initiated. Only then is it possible that both inputs of the AND-gates 42 or 43 are present.

While we have shown and described several embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are within the scope of those skilled in the art.

We claim:

1. An installation for preventing the spinning of the spinning of the driven wheels on a motor vehicle of the type having driven and non-driven wheels on each of two respective vehicle sides, said installation comprising monitoring means for determining the rotational speed differential between the driven and non-driven wheels and control means for controlling the rotational speed of the driven wheels in response to a predetermined rotational speed differential determined by the monitoring means; said monitoring means including wheel generator means for each wheel for producing a voltage corresponding to the rotational speed of a respective wheel, differential amplifier means on each vehicle side having inputs for accepting voltages produced by respective driven and non-driven wheels from the respective vehicle side, and voltage divider means operatively connected to respective driven wheel generator means for establishing a voltage difference corresponding to said predetermined rotational speed differential in the circuit between the respective driven wheel and its amplifier input; characterized in that the output of the respective differential amplifier means of each vehicle side is operatively connected to its own brake actuating means for actuating brake means provided at the respective corresponding driven wheel.

2. An installation according to claim 1, further comprising wheel brake cylinders for each of the driven wheels, pressure tank means for supplying a braking fluid medium to the respective cylinders, and connecting means for operatively connecting said cylinders to said tank means, said connecting means including inlet valve means, and wherein said respective actuating means includes means for controlling the respective inlet valve means.

3. An installation according to claim 2, further comprising brake holding means for maintaining engagement of the respective brake means over a predetermined slippage range.

4. An installation according to claim 3, characterized in that said brake holding means includes inlet valve means and discharge valve means operatively arranged in a braking fluid medium circuit containing the pressure tank, said inlet valve means being shiftable by differential amplifier means adjusted to a predetermined upper limit value of the slippage, and said discharge valve means being shiftable by differential amplifier means adjusted to a predetermined lower limit value of the slippage.

5. An installation according to claim 4, characterized in that the discharge valve means is actuated by a transistor means, an AND-gate being connected to the input of the transistor means, one input of the AND-gate being operatively connected with the output of the differential amplifier means adjusted to the lower boundary value of the slippage range and the other input thereof being connected to a pressure switch means arranged between the inlet valve means and the discharge valve means.

6. An installation according to claim 5, characterized in that the output of the differential amplifier means adjusted to the upper boundary value of the slippage range opens the inlet valve means by way of an interconnected transistor means which simultaneously closes a closure valve means separating the brake medium circulatory system from a master brake cylinder.

7. An installation according to claim 6, characterized in that the slippage-dependent control means acting on the wheel brakes are adapted to be disengaged during the normal brake operation by a contact means.

8. An installation according to claim 7, characterized in that said contact means is associated with a brake light switch means.

9. An installation according to claim 2, characterized in that said brake holding means includes inlet valve means and discharge valve means operatively arranged in a braking fluid medium circuit containing the pressure tank, said inlet valve means being shiftable by differential amplifier means adjusted to a predetermined upper limit value of the slippage, and said discharge valve means being shiftable by differential amplifier means adjusted to a predetermined lower limit value of the slippage.

10. An installation according to claim 9, characterized in that the discharge valve means is actuated by a transistor means, and AND-gate being connected to the input of the transistor means, one input of the AND-gate being operatively connected with the output of the differential amplifier means adjusted to the lower boundary value of the slippage range and the other input thereof being connected to a pressure switch means arranged between the inlet valve means and the discharge valve means.

11. An installation according to claim 9, characterized in that the output of the differential amplifier means adjusted to the upper boundary value of the slippage range opens the inlet valve means by way of an interconnected transistor means which simultaneously closes a closure valve means separating the brake medium circulatory system from a master brake cylinder.

12. An installation according to claim 11, characterized in that the slippage-dependent control means acting on the wheel brakes are adapted to be disengaged during the normal brake operation by a contact means.

13. An installation for preventing the spinning of the driven wheels on a motor vehicle of the type having driven and non-driven wheels on each of two respective vehicle sides, said installation comprising separate monitoring means for each vehicle side for determining the rotational speed differential between the driven and non-driven wheels on the respective vehicle side and separate control means for each vehicle side for controlling the rotational speed of the respective driven wheels at a respective vehicle side in response to a predetermined rotational speed differential for the respective driven and non-driven wheels at a respective vehicle side which is measured by the respective monitoring means associated with said respective vehicle side.

14. An installation according to claim 13, characterized in that said control means include brake actuating means for actuating wheel brake means provided on said driven wheels.

15. An installation according to claim 13, characterized in that said monitoring means includes measuring means for separately measuring the rotational speed of each of the driven and non-driven wheels and separate comparator means for each vehicle side for determining the rotational speed differential between the respective driven and non-driven wheels at said respective vehicle side.

16. An installation according to claim 15, characterized in that said measuring means comprise electrical generator means at each wheel for producing voltages corresponding to the rotational speed of the respective wheel.

17. An installation according to claim 16, characterized in that said control means include brake actuating means for actuating wheel brake means provided on said driven wheels.

18. An installation according to claim 13, further comprising brake system override means for operatively disconnecting said separate control means in response to actuation of a standard vehicle braking system.

References Cited

UNITED STATES PATENTS

| | | | |
|---|---|---|---|
| 2,869,687 | 1/1959 | Keim et al. | 303—21 FUX |
| 3,260,555 | 7/1966 | Packer | 303—21 EB |
| 3,503,654 | 3/1970 | Stamm | 303—21 EB |
| 3,520,575 | 7/1970 | Steigerwald | 303—21 BE |

MILTON BUCHLER, Primary Examiner

J. J. McLAUGHLIN, Assistant Examiner

U.S. Cl. X.R.

188—181 C